(12) United States Patent  
Sakamoto

(10) Patent No.: US 8,339,594 B2
(45) Date of Patent: Dec. 25, 2012

(54) METHOD FOR MEASURING SEMICONDUCTOR WAFER PROFILE AND DEVICE FOR MEASURING THE SAME USED THEREFOR

(75) Inventor: Shinji Sakamoto, Tokyo (JP)

(73) Assignee: Sumco Corporation, Tokyo (JP)

(*) Notice: Subject to any disclaimer, the term of this patent is extended or adjusted under 35 U.S.C. 154(b) by 210 days.

(21) Appl. No.: 12/953,523

(22) Filed: Nov. 24, 2010

(65) Prior Publication Data

US 2011/0123092 A1 May 26, 2011

(30) Foreign Application Priority Data

Nov. 24, 2009 (JP) ................................. 2009-266535

(51) Int. Cl.
*G01N 21/00* (2006.01)
(52) U.S. Cl. .................................. 356/237.2; 356/237.1
(58) Field of Classification Search ..... 356/237.1–237.5
See application file for complete search history.

(56) References Cited

U.S. PATENT DOCUMENTS

2003/0030795 A1* 2/2003 Swan et al. ................. 356/237.4
2009/0316143 A1* 12/2009 Yokota et al. ............... 356/237.5

FOREIGN PATENT DOCUMENTS

JP 07-208969 8/1995

* cited by examiner

*Primary Examiner* — Michael P Stafira
(74) *Attorney, Agent, or Firm* — Clark & Brody

(57) ABSTRACT

Disclosed is a method for measuring a profile using a device for measuring the profile in which included are: a distance measuring means 2 for measuring the distance to an edge region of a semiconductor wafer 12 in such a manner that light is emitted to be reflected at the edge region and to be detected; a first swing mechanism swingably supporting the distance measuring means 2; and a second swing mechanism swingably supporting the first swing mechanism, the method comprising the steps of: locating angles of the first swing mechanism each of which gives a maximum intensity of received light at each of predetermined angles of the second swing mechanism thereof; calculating contour points using coordinate transformation, thereby enabling points-related data to be acquired to represent a contour profile of the edge region. Thus, the method can be used for edge profile measurement of large-diameter wafers.

8 Claims, 8 Drawing Sheets

METHOD FOR MEASURING SEMICONDUCTOR WAFER PROFILE AND DEVICE FOR MEASURING THE SAME USED THEREFOR

BACKGROUND OF THE INVENTION

1. Field of the Invention

The present invention relates to a method for measuring an edge profile of a semiconductor wafer and a device for measuring the profile used therefor, specifically to a method for measuring the profile and to a device for measuring the profile used therefor that prevent scratches and flaws from being generated on semiconductor wafers due to contact between semiconductor wafers and measuring instruments, as being applicable to large-diameter wafers.

2. Description of the Related Art

When surfaces of semiconductor wafers are machined in a slicing process or a polishing process, peripheries of wafers likely contain acute-angled edges, causing cracking or chip on wafers when they come into contact with transferring devices. For this reason, wafers are subjected to edge-preparation to remove acute-angled edges on peripheries of wafers to form peripheries in a rounded or chamfered profile. Edge profiles and edge dimensions of wafers formed by chamfering need to be determined and finished within ranges specified by standards established by industrial organizations or customer requirements. Thus, in wafer manufacturing process, acceptance inspection is conducted to measure edge profiles of wafers to confirm whether they are within predetermined ranges after, for example, chamfering or finishing polishing.

In relation to measuring edge profiles of wafers, for example, Japanese Patent Application Publication No. 07-208969 describes a method where a wafer is rotatably supported while allowing the wafer to rotate around a point on the periphery end surface thereof as the center of rotation, and the wafer is rotated around the point on the periphery thereof as the center while a stylus of a profile measuring instrument is pressed against the periphery end surface of the wafer to measure contact positions of the stylus relative to rotation angles. Then, an edge profile of the wafer is elucidated by calculating a contour profile of the wafer using coordinate transformation by means of a calculation means.

The method described in Japanese Patent Application No. 07-208969 may cause scratches on wafers due to measurements with a stylus pressed against wafers, while generating dust due to physical contact to deposit on the wafer, likely causing wafer defects.

In order to prevent scratches and defects from being generated due to measurements of edge profiles of wafers, used is a method that measures an edge profile by measuring a projected shadow by emitting parallel light to a peripheral edge region of a wafer.

FIG. 1 shows a conventional method for measuring an edge profile of a wafer using a projection method. The measuring device shown in the figure comprises an emitting part 16 to emit parallel light to an edge region of a wafer, and a projection part 17 where a shadow of the edge region of the wafer is projected by the parallel light. An edge profile of a wafer 12 is measured using the measuring device shown in the figure by disposing the wafer between the emitting part 16 and the projection part 17, then radiating parallel light to the wafer by the emitting part 16, projecting a shadow on the projection part 17, and applying image processing to the shadow to calculate dimensions of the chamfered region.

The method for measuring an edge profile of a wafer using the projection method enables profile measurement to be performed without, for example, a stylus in contact with edge regions of wafers, thus preventing scratches on edge regions and flaws on surfaces of wafers from being generated due to measurement.

When the wafer becomes large in diameter, however, loads exerted to the supporting points for supporting the wafer will increase as well as the self-weight of wafer, thus increasing strain exerted to the wafer, resulting in irregular flexure at the edge region. Thus, when parallel light is emitted to the wafer to project its shadow on the projection part, the contour of the shadow will be blurred. In addition, the emitted parallel light would project shadows covering a wide range of the chamfered region of the wafer in the direction along the chamfered surface and if the profile is irregular in the direction of the parallel light, the contour of the projected shadow will also be blurred. Due to these factors, dimensions of chamfered regions cannot be calculated accurately by image processing. Thus, the method for measuring a profile using the projection method has not been applicable to measurement of large-diameter wafers, especially wafers of more than 400 mm in diameter.

In addition, wafers may be provided with notches on their peripheries as indicators of crystal orientation. The method for measuring a profile using the projection method cannot project shadows of notches, thus unable to measure profiles thereof. In some cases, orientation flats may be provided on peripheries of wafers as indicators of crystal orientation by forming straight portions in parts of the peripheries of wafers. Although the periphery of wafer at the orientation flat is straight, the chamfered profile such as the radii of round corners on the straight portion gradually changes due to its processing method. Because of this, the projection method does not provide shadows thereof, thus unable to measure the profiles thereof.

SUMMARY OF THE INVENTION

As mentioned above, the conventional contact-type method for measuring an edge profile of a semiconductor wafer may cause scratches on edge regions and flaws on surfaces of wafers due to direct contact with the stylus. The method for measuring profiles using a projection method can measure neither profiles of wafers of large diameters, nor profiles of laid notches and orientation flats.

The present invention is achieved in view of such circumstances and intends to provide a method for measuring a profile of a semiconductor wafer and a device for measuring a profile used therefor that prevent generation of scratches and flaws due to contact between wafers and styluses and that are applicable to measurement of a profile of not only an edge region of a large-diameter wafer but also a laid notch and an orientation flat.

To solve the above problems, the present inventors have conducted various tests and studies on a method that measures an edge profile of a wafer using a distance measuring means for measuring distances to an edge region of a wafer by emitting light from a light emitting part to be reflected at the edge region of the wafer and by detecting it at a light receiving part. As a result, the present inventors have found that an edge profile of a wafer can be measured using a device for measuring a profile comprising a distance measuring means, a first swing mechanism swingably supporting the distance measuring means within a certain angular range, and a second swing mechanism having a swing axis parallel to and at a predetermined distance to the swing axis of the first swing mechanism, the second swing mechanism swingably supporting the first swing mechanism within a certain angular range.

The present invention was made based on the above findings and is summarized as methods of (1) to (3) for measuring profiles of semiconductor wafers and devices of (4) to (6) for measuring profiles of semiconductor wafers as below.

(1) A method for measuring an edge profile of a semiconductor wafer using a device for measuring a profile, the device comprising: a distance measuring means for measuring distances to an edge region of the semiconductor wafer by emitting light from a light emitting part to be reflected at the edge region of the semiconductor wafer and by detecting it at a light receiving part; a first swing mechanism swingably supporting the distance measuring means within a certain angular range; and a second swing mechanism having a swing axis parallel to and at a predetermined distance to the swing axis of the first swing mechanism, the second swing mechanism swingably supporting the first swing mechanism within a certain angular range, wherein the method comprises the steps of: placing the edge region of the semiconductor wafer within a measuring range while maintaining the surfaces of the semiconductor wafer in parallel to the swing axis of the second swing mechanism; finding angles of the first swing mechanism each of which gives a maximum intensity of received light at each of predetermined angles of the second swing mechanism by emitting light from the light emitting part in the distance measuring means to be reflected at an edge point of the semiconductor wafer and by measuring intensities of received light at the light receiving part; and calculating contour points using coordinate transformation from distances measured by the distance measuring means relative to each of angles of the first swing mechanism, angle information of the first swing mechanism, and predetermined angles of the second swing mechanism, thereby obtaining points-related data indicating a contour profile of the edge region of the semiconductor wafer.

(2) In the method for measuring a profile as described in the above (1), dimensions of the edge region of the semiconductor wafer are preferably measured by image analysis of the contour profile obtained from the points-related data.

(3) In the method for measuring a profile as described in above (1) or (2), the predetermined angles are preferably set at intervals of a constant angle in the angular range from a measurement start angle to a measurement end-point angle of the second swing mechanism.

(4) A device for measuring an edge profile of a semiconductor wafer, the device comprising: a distance measuring means for measuring distances to an edge region of the semiconductor wafer by emitting light from a light emitting part to be reflected at the edge region of the semiconductor wafer and by detecting it at a light receiving part; a first swing mechanism swingably supporting the distance measuring means within a certain angular range; a second swing mechanism having a swing axis parallel to and at a predetermined distance to the swing axis of the first swing mechanism, the second swing mechanism swingably supporting the first swing mechanism within a certain angular range; a guide supporting the semiconductor wafer in such a manner that the edge region thereof is placed within the range of measurement while maintaining the surfaces of the semiconductor wafer in parallel to the swing axis of the second swing mechanism; a control means for operating the distance measuring means, the first swing mechanism, and the second swing mechanism; and a coordinate transformation means for calculating contour points using coordinate transformation from distances measured by the distance measuring means, and angle information of the first swing mechanism and the second swing mechanism.

(5) The device for measuring a profile as described in the above (4), preferably further comprises an image analysis means for calculating dimensions of the edge region of the semiconductor wafer by image analysis of the contour profile indicated by the points-related data thus obtained.

(6) In the device for measuring a profile as described in the above (4) or (5), the guide preferably supports the semiconductor wafer so as to be rotatable in a circumferential direction.

The term "range of measurement" as used herein means a range in which an edge region of a semiconductor wafer can be measured by the device for measuring a profile. The range of measurement is determined by the range of measurable distances by the distance measuring means in the device for measuring a profile, and the distance between the swing axis of the first swing mechanism and the swing axis of the second swing mechanism. An example of a measuring range is shown in FIGS. 3A and 3B as mentioned below.

The method for measuring a profile according to the present invention uses a distance measuring means for measuring distances without contact with an edge region of a semiconductor wafer, and measures profiles with points-related data indicating a contour profile obtained by calculating contour points from measured distances and angles relative to distances. Thus, the method prevents generation of scratches on edge regions and flaws on surfaces of wafers and enables measurement of edge profiles of not only an edge region of a large-diameter wafer but also an edge region even with a laid notch or an orientation flat.

According to the device for measuring a profile of the present invention, the method for measuring a profile according to the present invention can be achieved in a labor-saving manner by operating the distance measuring means, the first swing mechanism, and the second swing mechanism by use of control means.

BRIEF DESCRIPTION OF THE DRAWINGS

FIGS. 3A and 3B are side views illustrating the range of measurement in a device for measuring a profile used in the method for measuring a profile according to the present invention, wherein FIG. 3A shows a state where an edge region of a semiconductor wafer is placed within the range of measurement, and FIG. 3B shows a state where an edge region of a semiconductor wafer is placed outside the range of measurement;

FIGS. 4A to 4D illustrate a measurement procedure of the method for measuring a profile according to the present invention, wherein FIG. 4A shows when a wafer is mounted, FIG. 4B shows when the second swing mechanism is set at a predetermined angle, FIG. 4C shows how such an angle is located that gives a maximum intensity of received light, and FIG. 4D shows when distance measurement takes place;

FIGS. 5A to 5C illustrate a configuration example of a device for measuring a profile of semiconductor wafer according to the present invention, wherein FIG. 5A shows a top view, FIG. 5B shows a front view and FIG. 5C shows a side view;

DETAILED DESCRIPTION OF THE PREFERRED EMBODIMENTS

The method for measuring a profile of a semiconductor wafer and the device for measuring a profile used therefor according to the present invention are now discussed in details.

[Method for Measuring Profile of Semiconductor Wafer]

The method for measuring a profile according to the present invention is to measure an edge profile of a semiconductor wafer using a device for measuring a profile, the device comprising: a distance measuring means for measuring distances to the edge region of the semiconductor wafer by emitting light from a light emitting part to be reflected at the edge region of the semiconductor wafer and by detecting it at a light receiving part; a first swing mechanism swingably supporting the distance measuring means within a certain angular range; and a second swing mechanism having a swing axis parallel to and at a predetermined distance to the swing axis of the first swing mechanism, the second swing mechanism swingably supporting the first swing mechanism within a certain angular range.

Figure 1:
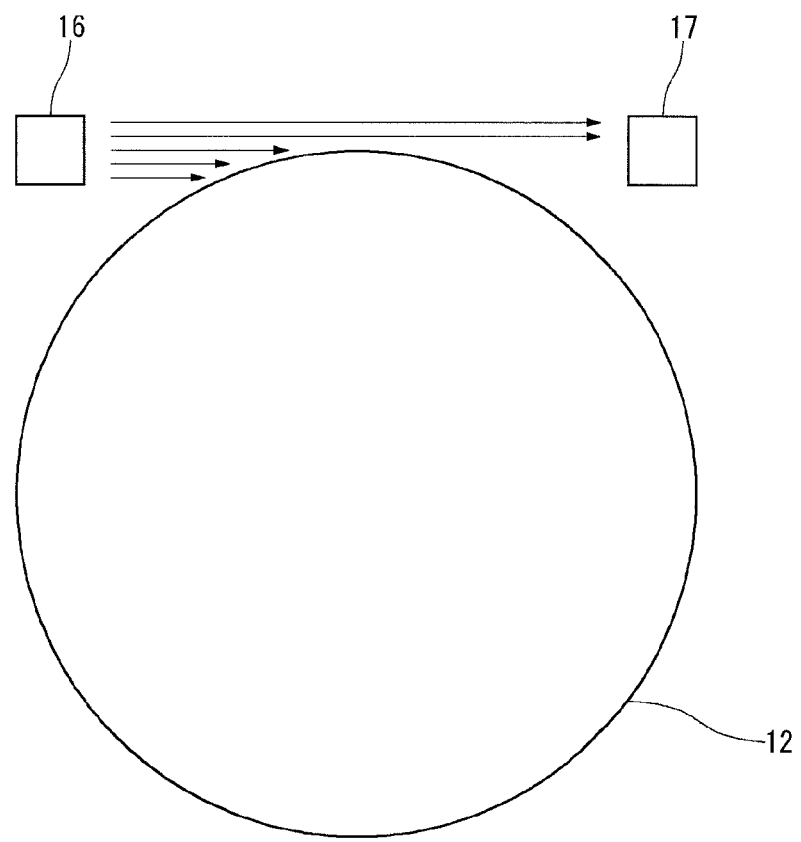
FIG. 1 shows a conventional method for measuring an edge profile of a wafer using a projection method.
Figure 2:
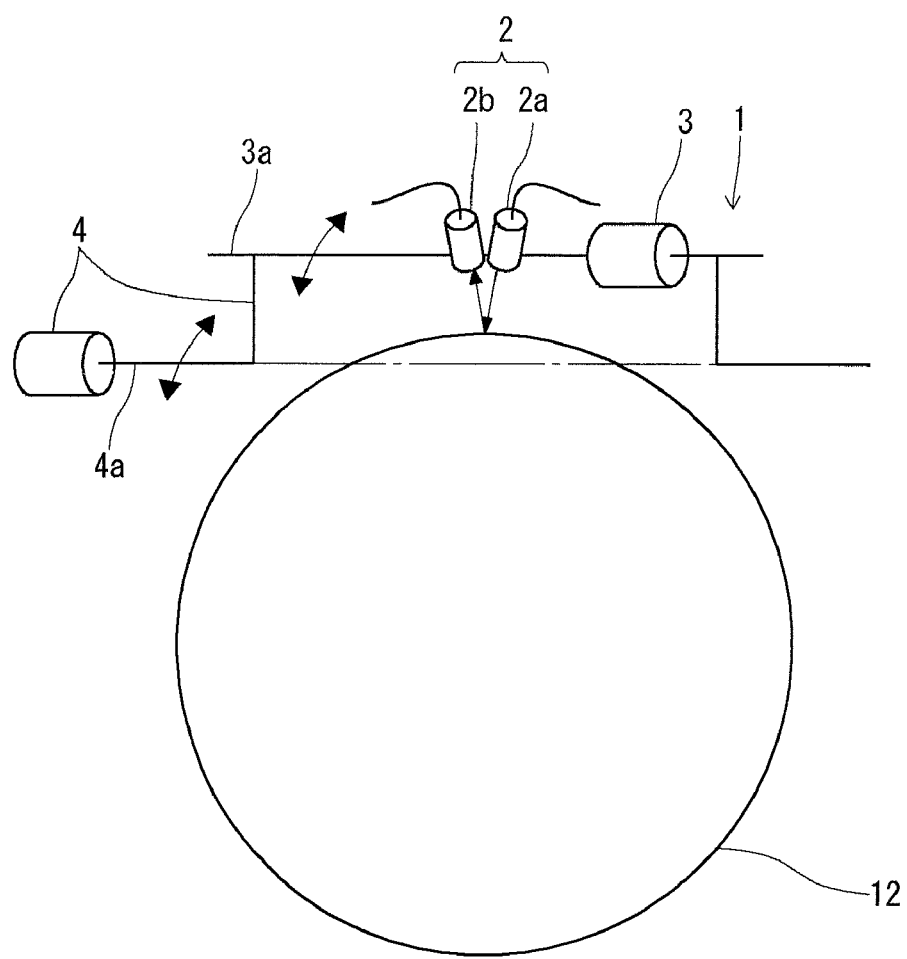
FIG. 2 is a front view schematically showing a device for measuring a profile used in the method for measuring a profile according to the present invention.

FIG. 2 is a front view schematically showing a device for measuring a profile used in the method for measuring a profile according to the present invention. The device 1 for measuring a profile shown in the figure comprises a distance measuring sensor 2 as a distance measuring means, a first swing mechanism 3 swingably supporting the distance measuring sensor 2 within a certain angular range, and a second swing mechanism 4 swingably supporting the first swing mechanism 3 within a certain angular range. The distance measuring sensor 2 measures distances to an edge region of a wafer 12 by emitting light from a light emitting part 2a to be reflected at the edge region of the wafer 12 and by detecting it at a light receiving part 2b. The swing axis 4a of the second swing mechanism is disposed in parallel to and at a predetermined distance to the swing axis 3a of the first swing mechanism.

The measurable distances by the distance measuring sensor 2 are limited within the range where reflected light emitted from the light emitting part 2a can be received by the light receiving part 2b. In other words, if the edge region of a wafer is too close to or too far from the device, the reflected light emitted from the light emitting part cannot reach the light receiving part in the distance measuring sensor 2, thus unable to measure the distance. Thus, in order to make measurement of edge profiles of the wafer 12 with the device 1 for measuring a profile, the edge region of the wafer needs to be placed within the range where the device for measuring a profile can measure (range of measurement). The range of measurement is determined by the range of measurable distances by the distance measuring means in the device for measuring a profile, and the distance between the swing axis of the first swing mechanism and the swing axis of the second swing mechanism.

Figure 3A:
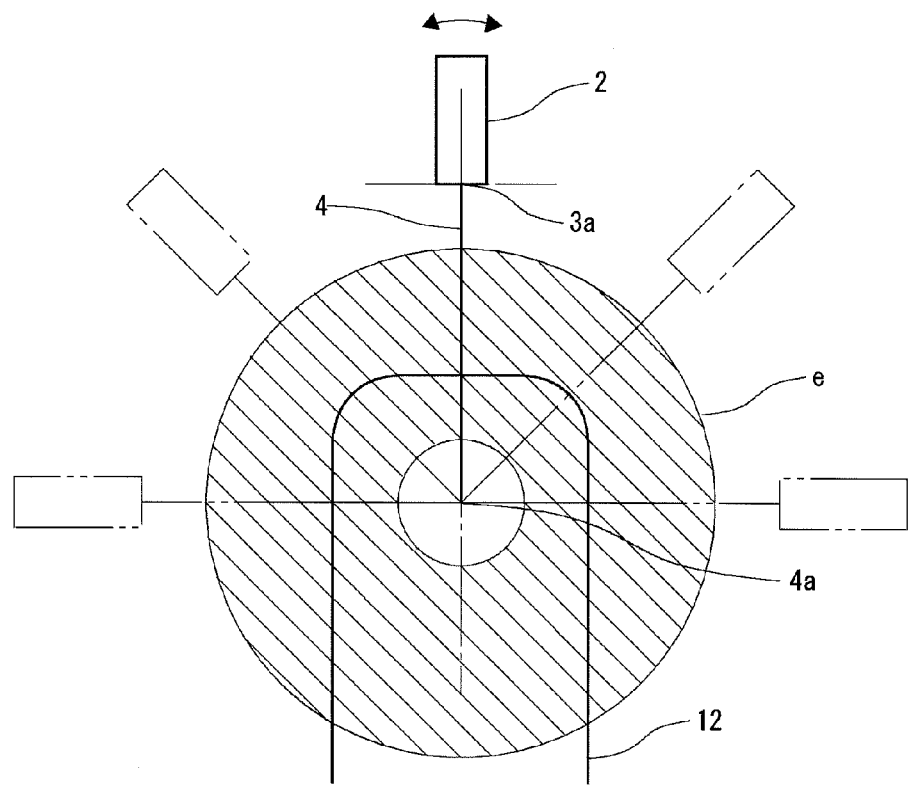
Figure 3B:
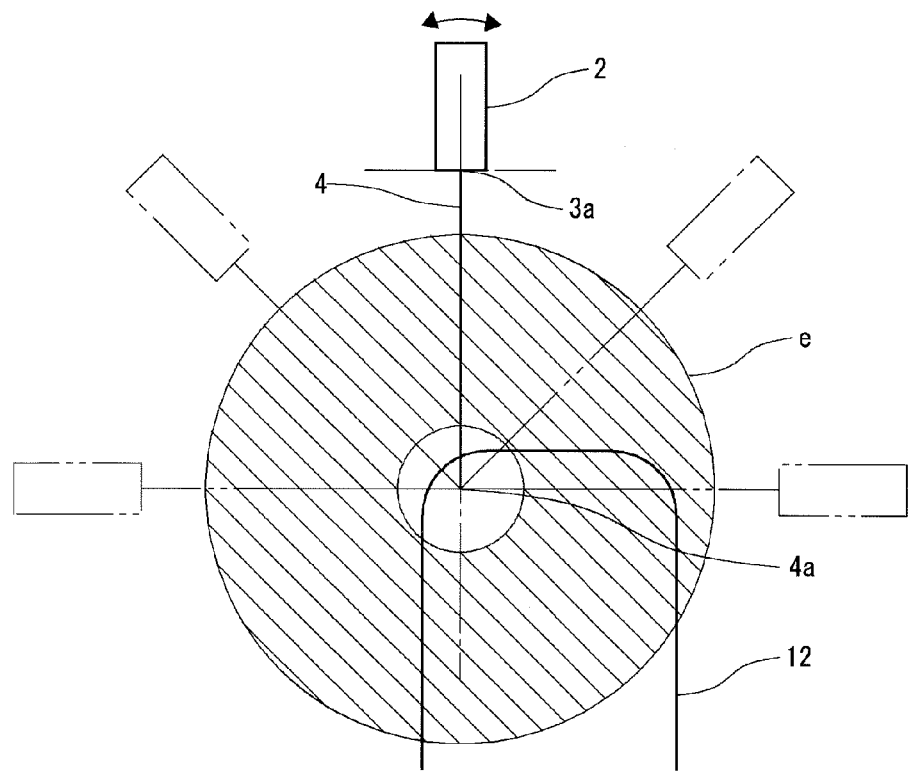

FIGS. 3A and 3B are side views illustrating the range of measurement in a device for measuring a profile used in the method for measuring a profile according to the present invention, wherein FIG. 3A shows a state where an edge region of a semiconductor wafer is placed within the range of measurement and FIG. 3B shows a state where an edge region of a semiconductor wafer is placed outside the range of measurement. FIGS. 3A and 3B, which are side views schematically showing a device for measuring a profile, show a distance measuring sensor 2, a swing axis 3a of a first swing mechanism, a swing axis 4a of a second swing mechanism, and a wafer 12.

In FIGS. 3A and 3B, shaded areas represent the range of measurement, where an edge region of a wafer needs to be placed. As shown in FIG. 3A, when an edge region of a wafer 12 is placed within the range, profile measurement is possible, and as shown in FIG. 3B, when a part of the edge region of the wafer 12 is placed outside the range of measurement, profile measurement is impossible for that part.

The method for measuring a profile according to the present invention is a method for measuring an edge profile of a semiconductor wafer using a device for measuring a profile of the above configuration, wherein the method comprises the steps of: placing the edge region of the semiconductor wafer within the range of measurement while maintaining the surfaces of the semiconductor wafer in parallel to the swing axis of the second swing mechanism; locating the angle of the first swing mechanism which gives a maximum intensity of received light at each of predetermined angles of the second swing mechanism by emitting light from the light emitting part in the distance measuring means to be reflected at the edge region of the semiconductor wafer and by measuring intensities of received light at the light receiving part; calculating contour points using coordinate transformation from distances measured by the distance measuring means in relation to located angles of the first swing mechanism, angle information of the first swing mechanism, and the predetermined angles of the second swing mechanism, thereby obtaining points-related data indicating a contour profile of the edge region of the semiconductor wafer. An example of the measurement procedures with the method for measuring a profile according to the present invention will be explained with reference to FIGS. 4A to 4D.

Figure 4A:
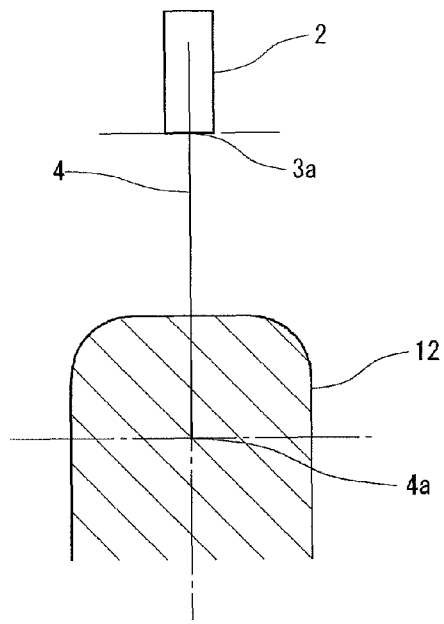
Figure 4B:
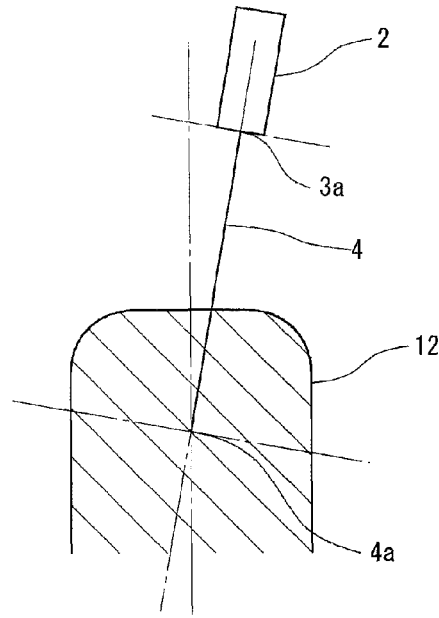
Figure 4C:
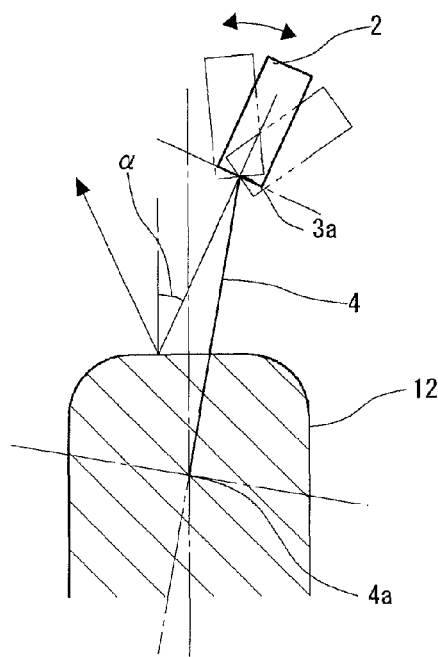
Figure 4D:
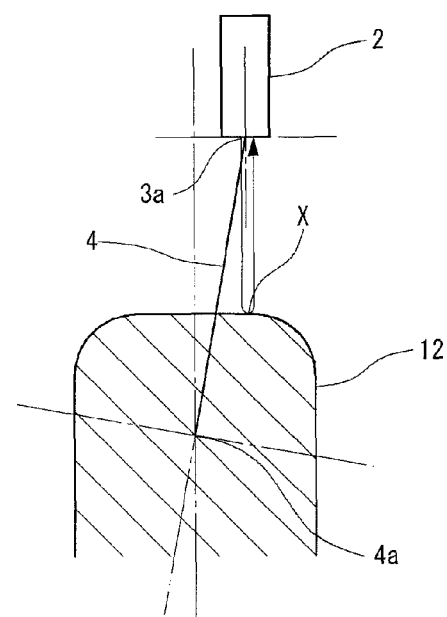

FIGS. 4A to 4D illustrate a measurement procedure of the method for measuring a profile according to the present invention, wherein FIG. 4A shows when a wafer is mounted, FIG. 4B shows when the second swing mechanism is set at a predetermined angle, FIG. 4C shows how such an angle is located that gives a maximum intensity of received light, and FIG. 4D shows when distance measurement takes place.

In the method for measuring a profile according to the present invention, a wafer 12 is mounted while maintaining the surfaces of the wafer in parallel to the swing axis of the second swing mechanism as shown in FIG. 4A. This is because, if the surfaces of the wafer and the swing axis of the second swing mechanism make an angle, measurement errors may be generated when measuring dimensions such as the radii of round corners or the angles of chamfered regions measured from an obtained contour profile, obstructing accurate acceptance inspection of edge regions of the wafer. The wafer 12 is mounted within the range of measurement, as mentioned above, to measure an edge profile thereof.

After the wafer 12 is mounted, the second swing mechanism 4 is swung to a predetermined angle as shown in FIG. 4B.

After arranging the second swing mechanism at a predetermined angle, by emitting light from the light emitting part in the distance measuring sensor 2 to be reflected at the wafer and by measuring intensities of received light at the light receiving part, the angle of the first swing mechanism that gives a maximum intensity of received light is located.

When the incident angle $\alpha$ of light emitted from the distance measuring sensor 2 is 0 degrees, the intensity of received light becomes maximum. When the incidence angle $\alpha$ becomes larger than 0 degrees, the intensity of received light will decrease, since a part of light reflected from the wafer does not reach the light receiving part. When the incidence angle $\alpha$ becomes much larger, the intensity of received light will further decrease since light emitted from the light emitting part 2a does not reach the light receiving part 2b, as shown in FIG. 4C. Since targeting surfaces or edge regions of wafers are polished in general, the intensities of received light will show a sharp peak at an incidence angle of 0 degree, thus allowing the angle giving maximum intensities of received light to be located easily.

As shown in FIG. 4D, a point X (a contour point) on the contour of the wafer is calculated by locating an angle of the first swing mechanism which gives a maximum intensity of received light, and then using coordinate transformation from the distance measured by the distance measuring means at the angle of the first swing mechanism, the angle of the first swing mechanism, and a predetermined angle of the second swing mechanism.

After calculation of the contour point, the second swing mechanism is swung to another predetermined angle, and then a contour point is calculated with the above procedure by locating an angle of the first swing mechanism which gives a maximum intensity of received light, and then using coordinate transformation from the distance measured by the distance measuring means at the angle of the first swing mechanism, the angle of the first swing mechanism, and the predetermined angle of the second swing mechanism. Thus, an edge profile can be measured by calculating each contour point at each of predetermined angles and by obtaining points-relate data indicating the contour profile of the edge region of the wafer.

Unlike cases using the projection method, the method for measuring a profile according to the present invention directly measures a targeting edge region of a wafer, thus enabling profile measurement of the edge region even with a laid notch or an orientation flat.

In the method for measuring a profile according to the present invention, dimensions of an edge region of a wafer are preferably measured by image analysis of a contour profile obtained from the points-related data. This is because measurement of dimensions by image analysis facilitates acceptance inspection to determine whether dimensions are within the predetermined ranges. The image analysis may be a conventional analysis method.

The method for measuring a profile according to the present invention measures profiles by locating angles of the first swing mechanism each of which gives a maximum intensity of received light at each of predetermined angles of the second swing mechanism and by calculating contour points. Predetermined angles of the second swing mechanism for calculating contour points may be arbitrarily determined depending on the edge profile of a wafer.

In the method for measuring a profile according to the present invention, the predetermined angles of the second swing mechanism for calculating contour points are preferably set at intervals of a constant angle in the range from a measurement start angle to a measurement end-point angle of the second swing mechanism. This is because, as after-mentioned with reference to FIG. 8, contour points calculated on round corners occur densely while contour points calculated on the surfaces of a wafer and the peripheral surface thereof occur sparsely, thus allowing accurate measurement on the round corners, which is important in acceptance inspection of edge region.

In the method for measuring a profile according to the present invention, angles of the first swing mechanism each of which gives a maximum intensity of received light at the light receiving part of the distance measuring means at each of predetermined angles of the second swing mechanism may be located with various methods. For example, the first swing mechanism may be swung while measuring the intensity of received light. When targeting edge profiles of wafers are limited, time required for locating angles of the first swing mechanism which give maximum intensities of received light can be shortened by predicting the angles and measuring intensities of received light at or near the predicted angles.

In the method for measuring a profile according to the present invention, when placing an edge region of a wafer in the range of measurement, the wafer is preferably mounted such that the swing axis of the second swing mechanism is positioned on the thickness-wise middle plane of the wafer. This is because, as after-mentioned with reference to FIGS. 8 and 9, if the swing axis of the second swing mechanism is positioned on the thickness-wise middle plane of the wafer, the number of measured contour points on the wafer will be the same on either right-hand side or left-hand side with respect to the plane of the thickness-wise middle of the wafer, enabling the measurement to be conducted with the same accuracy on either side.

[Device for Measuring Profile of Semiconductor Wafer]

Figure 5A:
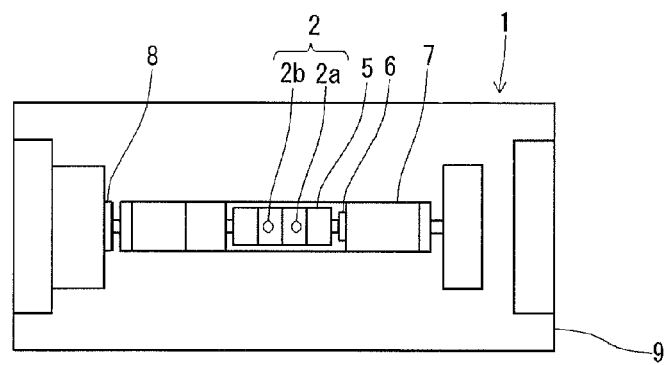
Figure 5B:
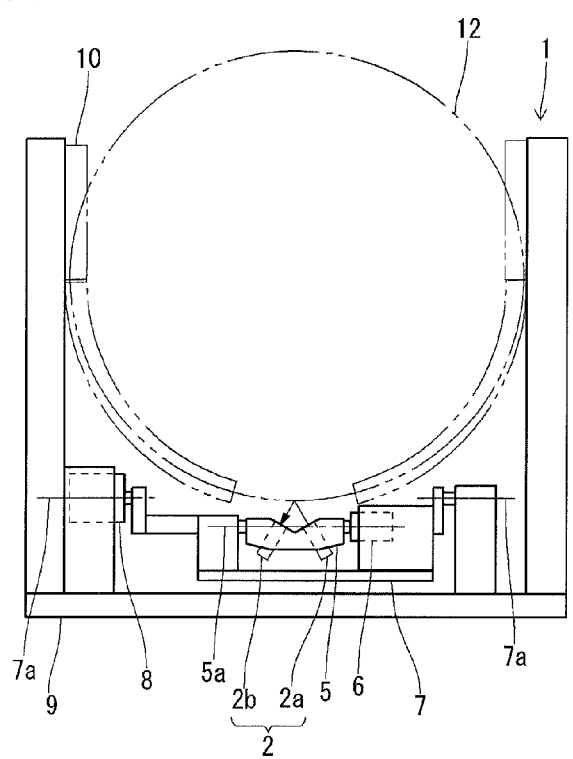
Figure 5C:
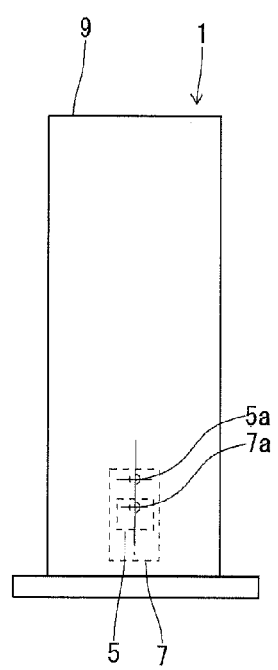

FIGS. 5A to 5C illustrate a configuration example of a device for measuring a profile of semiconductor wafer according to the present invention, wherein FIG. 5A shows a top view, FIG. 5B shows a front view and FIG. 5C shows a side view. The device 1 for measuring a profile shown in FIGS. 5A to 5C comprises a distance measuring sensor 2 for measuring the distance to a measuring target, a holding table 5 for mounting the distance measuring sensor 2, a crank arm 7 swingably supporting the distance measuring sensor 2 mounted on the holding table 5 within a certain angular range, a base 9 for swingably supporting the crank arm 7 within a certain angular range, a sensor motor 6 for driving the holding table 5 to swing, and a crank motor 8 for driving the crank arm 7 to swing.

The device for measuring a profile shown in FIGS. 5A to 5C also comprises, although not shown, a controller that operates the distance measuring sensor 2, the sensor motor 6 and the crank motor 8, and a coordinate transformation part that calculates contour points using coordinate transformation from distances measured by the distance measuring sensor 2, and angles of the sensor motor 6 and the crank motor 8. The device 1 for measuring a profile also comprises a guide 10 to mount a wafer 12 as shown in the imaginary line in FIG. 5B.

In the device for measuring a profile shown in FIGS. 5A to 5C, the first swing mechanism comprises the distance measuring sensor 2 as a distance measuring means, the holding table 5, and the sensor motor 6, and the second swing mechanism comprises the crank arm 7 and the crank motor 8. The swing axis 5a of the holding table 5 (the first swing mechanism), on which the distance measuring sensor 2 is mounted and the swing axis 7a of the crank arm 7 (the second swing mechanism) are arranged in parallel and at a predetermined distance to each other.

The device for measuring a profile according to the present invention is a device for measuring an edge profile of a semiconductor wafer, the device comprising: a distance measuring means for measuring distances to an edge region of the semiconductor wafer by emitting light from a light emitting part to be reflected at the edge region of the semiconductor wafer and by detecting it at a light receiving part; a first swing mechanism swingably supporting the distance measuring means within a certain range of angles; a second swing mechanism having a swing axis at a position parallel to and at a predetermined distance to a swing axis of the first swing mechanism, the second swing mechanism swingably supporting the first swing mechanism within a certain range of angles; a guide supporting the semiconductor wafer in a state where the edge region thereof is placed within the measuring range while maintaining the surfaces of the semiconductor wafer in parallel to the swing axis of the second swing mechanism; a control means for operating the distance measuring means, the first swing mechanism, and the second swing mechanism; and a coordinate transformation means for calculating contour points using coordinate transformation from distances measured by the distance measuring means, and angle information of the first swing mechanism and the second swing mechanism.

The guide 10 is provided so that an edge region of a wafer is easily placed within the range of measurement while maintaining the surfaces of the wafer in parallel to the swing axis of the second swing mechanism. The distance measuring means (distance measuring sensor 2) measures distances to an edge region of a wafer by emitting light from a light emitting part 2a to be reflected at the edge region of the wafer and by detecting it at a light receiving part 2b. Such a distance measuring means, which enables profile measurement without contact with edge regions of wafers, can prevent scratches to be formed on wafers and generation of dust through the contact to likely deposit on surfaces of the wafer to thereby cause flaws thereof.

The first swing mechanism enables the angle of the distance measuring means to change so that emitted light from the distance measuring means can be reflected at the edge region of the wafer with an incidence angle of 0 degrees, realizing distance measurement using the distance measuring means. The coordinate transformation means enables calculation of contour points, which indicate a contour profile of an edge region of a wafer. Furthermore, the second swing mechanism enables plural contour points on an edge region of a wafer to be calculated, providing points-related data indicating a contour profile.

The control means, which operates the distance measuring means, the first swing mechanism and the second swing mechanism, provides accurate measurement of a contour profile of an edge region of a wafer and saves labor hour required for profile measurement.

Unlike cases using the projection method, the device for measuring a profile according to the present invention directly measures a targeting edge region of a wafer, thus enabling profile measurement of the edge region of the wafer even with a laid notch and an orientation flat, owing to its capability of receiving reflected light even from the deepest point of the notch and a center region of the orientation flat. Profiles of straight portions of a notch and an orientation flat can be measured by adding a mechanism that further tilts the second swing mechanism such that the swing axis of the second swing mechanism can be parallel to the straight portions thereof.

The device for measuring a profile according to the present invention preferably further includes an image analysis means for calculating dimensions of the edge region of the semiconductor wafer by image analysis of a contour profile indicated by the points-related data obtained. This is because measurement of dimensions by the image analysis means facilitates acceptance inspection to determine whether dimensions are within predetermined ranges.

In the device for measuring a profile according to the present invention, the guide preferably supports a semiconductor wafer so as to be rotatable in a circumferential direction. This is because a guide capable of rotating a wafer enables edge profiles to be measured at multiple locations of the wafer without mounting/dismounting the wafer. For example, acceptance inspection of the edge profile of wafer can be conducted by measuring edge profiles of wafer at four locations in total by rotating the wafer by 90 degrees each. An example configuration of the guide that rotatably supports a wafer is shown in FIGS. 6A and 6B, which are discussed below.

Figure 6A:
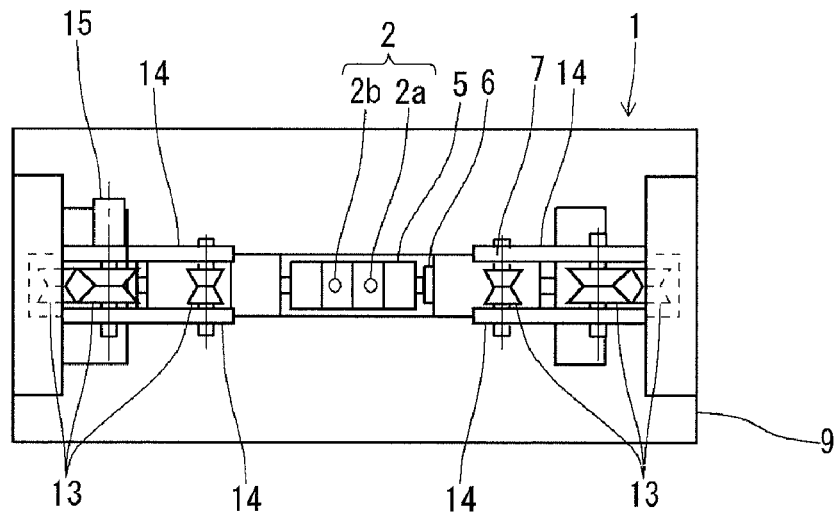
FIGS. 6A and 6B show a device for measuring a profile according to the present invention, which comprises a guide to support a semiconductor wafer so as to be rotatable in a circumferential direction.
Figure 6B:
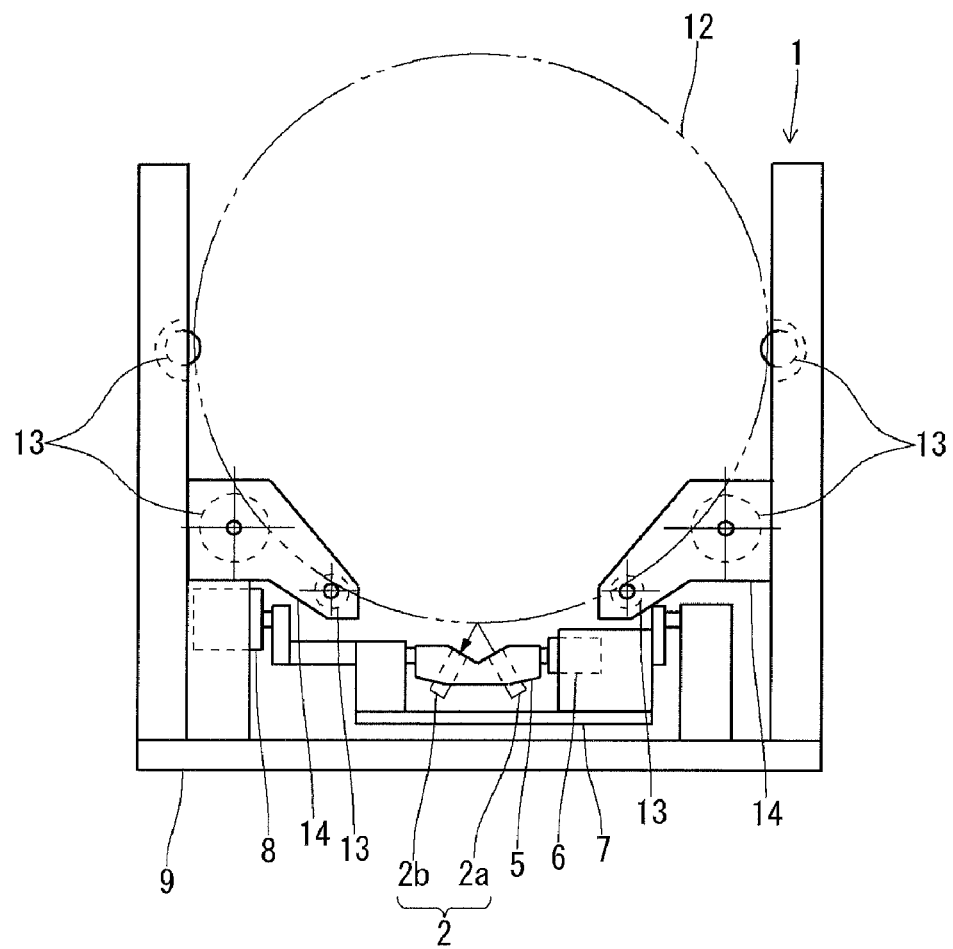

FIGS. 6A and 6B show a device for measuring a profile according to the present invention, which comprises a guide to support a semiconductor wafer so as to be rotatable in a circumferential direction. The guide shown in FIGS. 6A and 6B comprises plural rollers 13 provided with recessed portions for receiving the edge region of wafer, roller holding parts 14 for supporting the rollers 13 so as to be rotatable, and a roller motor 15 for driving the rollers to rotate. In the guide shown in FIGS. 6A and 6B, the rollers 13 are arranged around the periphery of the wafer 12 to receive and support the edge region of the wafer at the recessed portions of the rollers. As one of the rollers 13 is driven with the rotation of roller motor 15, the wafer rotates in a circumferential direction as rollers rotate.

EXAMPLE

An example of profile measurement with the method for measuring a profile of a semiconductor wafer and a device for measuring the profile used therefor according to the present invention is now discussed.

In the example, an edge profile of a wafer was measured with the device for measuring a profile shown in the above FIGS. 5A to 5C with the procedure described in the above FIGS. 4A to 4D. After mounting a wafer on the guide of the device for measuring a profile, the crank arm was set at a measurement start angle by the rotation of the crank motor. Then, an angle which gave a maximum intensity of received light was located by varying the angle of the distance measuring sensor by the rotation of the sensor motor while measuring intensities of received light with the distance measuring sensor.

Contour points were calculated using coordinate transformation from distances measured by the distance measuring sensor at angles that give maximum intensities of received light and from angle information of the sensor motor and the crank motor. The crank arm was swung to the measurement end-point angle at intervals of a constant angle by the rotation of the crank motor and points-related data was obtained by locating angles of the sensor motor each of which gives a maximum intensity of received light at each of set angles of the crank arm and by calculating contour points. In the example, the crank motor, the measurement start-point angle of which was set at −99 degrees and the measurement end-point angles of which was set at +99 degrees, was swung at intervals of 3 degrees from the measurement start-point angle to the measurement end-point angle. A wafer was used that had been subjected to end-preparation of rounding at its periphery.

[Calculation Example of Contour Points Using Coordinate Transformation]

Figure 7:
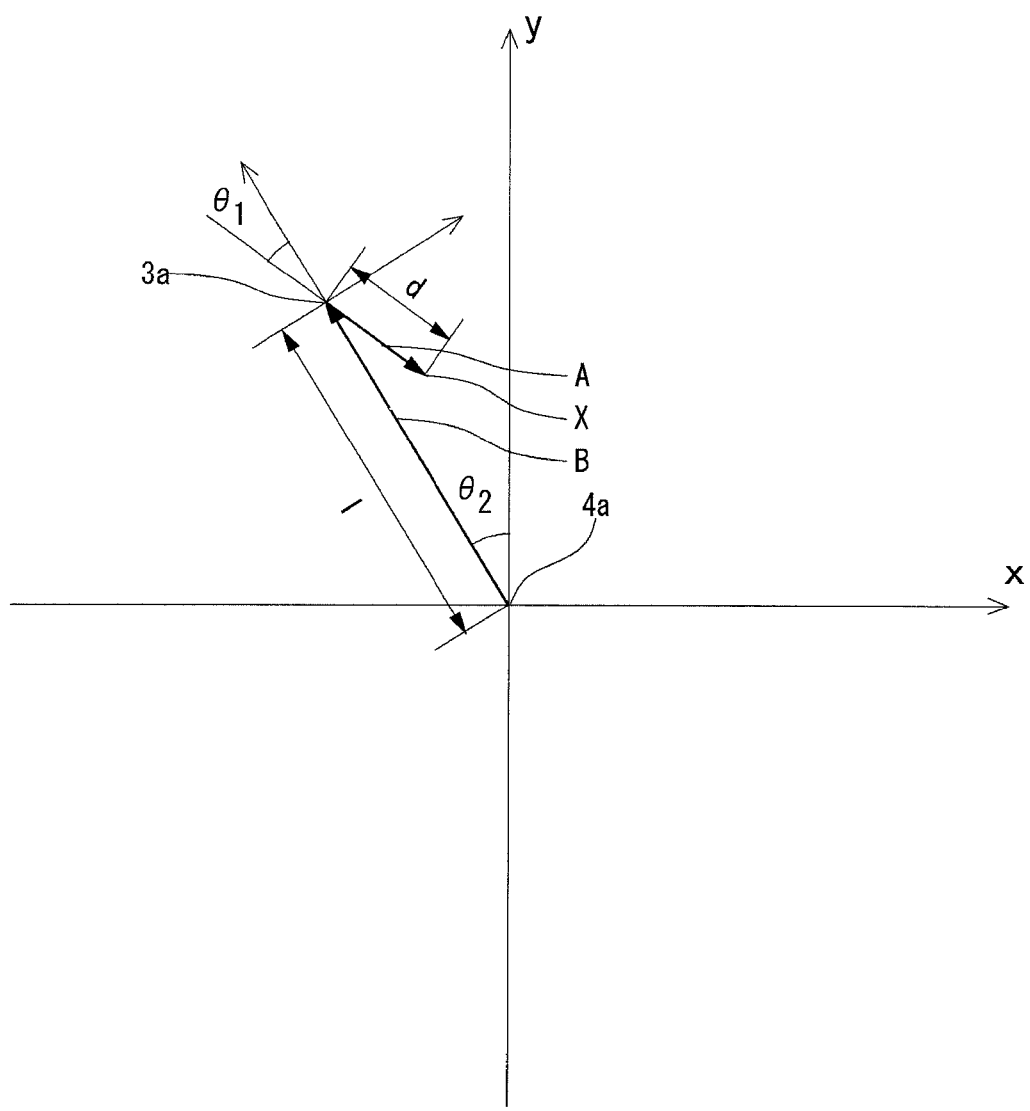
FIG. 7 illustrates a geometric model to calculate contour points using coordinate transformation in the method for measuring a profile according to the present invention.

FIG. 7 illustrates a geometric model to calculate contour points using coordinate transformation in the method for measuring a profile according to the present invention. The figure shows a swing axis 3a of a first swing mechanism, a swing axis 4a of a second swing mechanism, and a contour point X on the edge region of a wafer that gives a maximum intensity of received light. The distance 1 between axes, the swing axis 3a of the first swing mechanism and the swing axis 4a of the second swing mechanism, is a constant determined by the device specification, and a measured distance d between the swing axis of the first swing mechanism and the contour point X is a distance measured by the distance measuring means. As shown in the figure, the swing angle of the first swing mechanism is designated by $\theta_1$ and the swing angle of the second swing mechanism is designated by $\theta_2$.

When an inter-axis vector B is defined as a vector from the swing axis 4a of the second swing mechanism as the start point to the swing axis 3a of the first swing mechanism as the end point, and a distance vector A is defined as a vector from the swing axis of the first swing mechanism as the start point to the contour point X as the end point, the contour point X can be expressed as sum of the inter-axis vector B and the distance vector A.

When $R(\theta)$ is a coordinate transformation matrix for rotation by angle $\theta$, $B_0$ is an inter-axis vector B at 0 degrees of $\theta_2$ and $A_0$ is a distance vector A at 0 degrees of $\theta_1$, the inter-axis vector B at a rotation angle $\theta_2$ of the second swing mechanism is expressed as $R(\theta_2) B_0$. The distance vector A can be expressed as $R(\theta_1+\theta_2) A_0$ by considering that an additional swing (rotation) by the first swing mechanism is applied after the swing (rotation) by the second swing mechanism.

Here, the inter-axis vector $B_0$ at 0 degrees of $\theta_2$ is (0, 1), and the distance vector $A_0$ at 0 degrees of $\theta_1$ is (0, −d). Thus, when the coordinates of a contour point are represented by (x, y), the coordinate value is calculated as shown in Equation (1).

[Expression 1]

$$\begin{pmatrix} x \\ y \end{pmatrix} = R(\theta_2)\begin{pmatrix} 0 \\ 1 \end{pmatrix} + R(\theta_1 + \theta_2)\begin{pmatrix} 0 \\ -d \end{pmatrix} \quad (1)$$

$$= \begin{pmatrix} \cos\theta_2 & -\sin\theta_2 \\ \sin\theta_2 & \cos\theta_2 \end{pmatrix}\begin{pmatrix} 0 \\ 1 \end{pmatrix} +$$

$$\begin{pmatrix} \cos(\theta_1+\theta_2) & -\sin(\theta_1+\theta_2) \\ \sin(\theta_1+\theta_2) & \cos(\theta_1+\theta_2) \end{pmatrix}\begin{pmatrix} 0 \\ -d \end{pmatrix}$$

[Distribution of Contour Points]

Distribution of contour points calculated in the above condition was confirmed whether the contour profile was accurately represented. The confirmation of distribution of contour points was made for the case where the swing axis of the second swing mechanism was placed on a plane of the thickness-wise middle of wafer and for the case where the swing axis of the second swing mechanism was placed at a distance off the plane of the thickness-wise middle of wafer.

Figure 8:
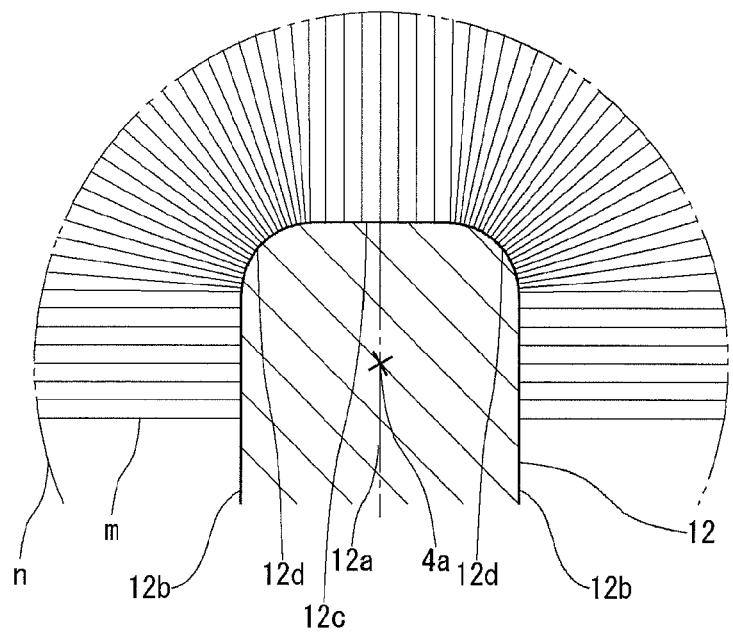
FIG. 8 shows a distribution state of calculated contour points in the case where a swing axis of a second swing mechanism is placed on a plane of the thickness-wise middle of wafer.

FIG. 8 shows distribution of calculated contour points for the case where the swing axis of the second swing mechanism was placed on a plane of the thickness-wise middle of wafer. As shown in the figure, the swing axis 4a of the second swing mechanism was placed on a plane 12a of the thickness-wise middle of wafer. The swing trajectory n shows loci of the swing axis of the first swing mechanism swung (rotated) by the second swing mechanism, line segments m represent angles each of which gave a maximum intensity of received light at each of predetermined angles of the second swing mechanism, and end-points of the line segments m on the wafer side represent contour points.

It was confirmed that the wafer-side end points of the line segments m (contour points) were sparsely spaced on surfaces 12b of the wafer and the peripheral end surface 12c thereof while they were densely spaced on rounded portions 12d, and the distribution is symmetrical with respect to a plane of the thickness-wise middle of wafer. The figure confirms that a contour profile of an edge region of the wafer is obtained from acquired points-related data, thus enabling edge profile measurement.

Figure 9:
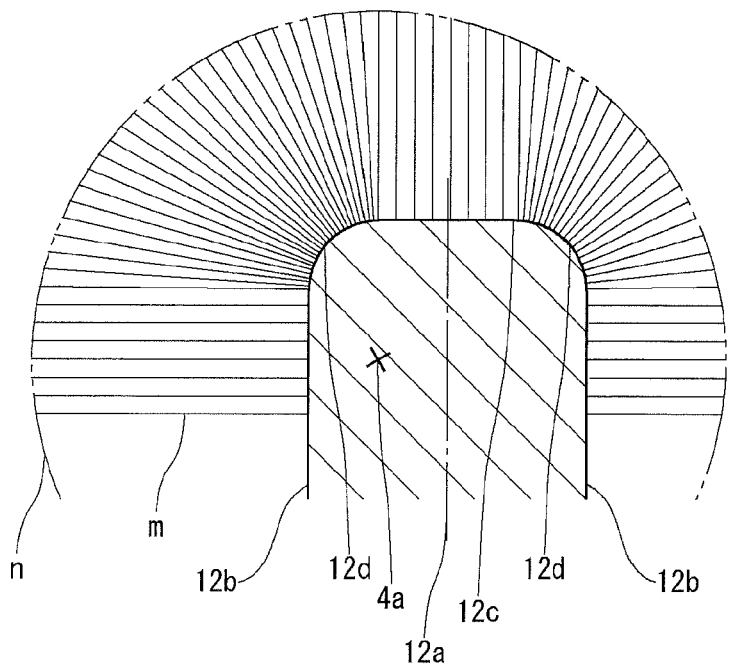
FIG. 9 shows a distribution state of calculated contour points in the case where a swing axis of a second swing mechanism is placed at a certain distance off the plane of the thickness-wise middle of wafer.

FIG. 9 shows distribution of calculated contour points for the case where the swing axis of the second swing mechanism was placed at a distance off the plane of the thickness-wise middle of wafer. As shown in the figure, the swing axis 4a of the second swing mechanism was distanced from the plane 12a of the thickness-wise middle of wafer.

The wafer-side end points of the line segments m (contour points) were sparsely spaced on surfaces 12b of wafer and the peripheral end surface 12c thereof while they were densely spaced on the round portions 12d. It was also confirmed that the number of end points (contour points) is different between two round portions 12d. The figure confirmed the feasibility of profile measurement even in the case where the swing axis of the second swing mechanism was placed at a distance off the plane of the thickness-wise middle of wafer. It was confirmed from the figure and the above FIG. 8 that it is preferable that the swing axis of second swing mechanism be placed on the plane of the thickness-wise middle of wafer, because the distribution of contour points gives the same number on either side with respect to the plane of the thickness-wise middle of wafer, enabling profile measurement to be conducted on either side with the same accuracy.

These proved that a contour profile of the edge region of wafer can be measured with the method for measuring a profile and the device for measuring a profile used therefor according to the present invention.

The method for measuring a profile according to the present invention uses a distance measuring means for measuring distances without contact with the edge region of semiconductor wafer, and measures profiles with points-related data indicating a contour profile obtained by calculating contour points from measured distances and angle information corresponding to distances. Thus, the method prevents generation of scratches on edge regions and flaws on surfaces of wafer and enables measurement of edge profiles of not only the edge region of a large-diameter wafer but also the edge region even with a laid notch or an orientation flat.

With the device for measuring a profile according to the present invention, the method for measuring a profile according to the present invention can be achieved in a laborsaving manner by operating, by use of a control means, a distance measuring means, a first swing mechanism, and a second swing mechanism.

Thus, by applying the method for measuring a profile and the device for measuring a profile used therefor according to the present invention to semiconductor wafer production, acceptance inspection of edge regions of large-diameters wafers can be achieved while suppressing deterioration of the product yield rate due to generation of scratches on edge regions and flaws on surfaces of wafers.

What is claimed is:

1. A method for measuring an edge profile of a semiconductor wafer using a device for measuring the profile in which included are:
a distance measuring means for measuring distances to an edge region of the semiconductor wafer in such a manner that light is emitted from a light emitting part thereof to be reflected at the edge region of the semiconductor wafer and to be detected at a light receiving part thereof;
a first swing mechanism swingably supporting the distance measuring means within a certain angular range; and
a second swing mechanism having a swing axis at a position parallel to and at a predetermined distance to a swing axis of the first swing mechanism, the second swing mechanism swingably supporting the first swing mechanism within a certain angular range, the method comprising the steps of:
placing the edge region of the semiconductor wafer within the range of measurement while maintaining the surfaces of the semiconductor wafer in parallel to the swing axis of the second swing mechanism;
locating angles of the first swing mechanism each of which gives a maximum intensity of received light at each of predetermined angles of the second swing mechanism in such a manner that light is emitted from the light emitting part in the distance measuring means to be reflected at the edge region of the semiconductor wafer and intensities of received light are measured at the light receiving part; and
calculating contour points using coordinate transformation based on distances measured by the distance measuring means at relevant angles of the first swing mechanism, angle information of the first swing mechanism, and predetermined angles of the second swing mechanism, thereby enabling points-related data to be acquired to represent a contour profile of the edge region of the semiconductor wafer.

2. The method for measuring an edge profile of a semiconductor wafer as claimed in claim 1, wherein dimensions of the edge region of the semiconductor wafer are measured by image analysis of the contour profile obtained from the points-related data.

3. The method for measuring an edge profile of a semiconductor wafer as claimed in claim 1, wherein the predetermined angles are set at intervals of a constant angle from a measurement start-point angle to a measurement end-point angle of the second swing mechanism.

4. The method for measuring an edge profile of a semiconductor wafer as claimed in claim 2, wherein the predetermined angles are set at intervals of a constant angle from a measurement start-point angle to a measurement end-point angle of the second swing mechanism.

5. A device for measuring an edge profile of a semiconductor wafer, the device comprising:
a distance measuring means for measuring distances to an edge region of the semiconductor wafer in such a manner that light is emitted from a light emitting part thereof to be reflected at the edge region of the semiconductor wafer and to be detected at a light receiving part thereof;
a first swing mechanism swingably supporting the distance measuring means within a certain angular range;
a second swing mechanism having a swing axis at a position parallel to and at a predetermined distance to a swing axis of the first swing mechanism, the second swing mechanism swingably supporting the first swing mechanism within a certain angular range;
a guide supporting the semiconductor wafer in a state where the edge region thereof is placed within the range of measurement while maintaining the surfaces of the semiconductor wafer in parallel to the swing axis of the second swing mechanism;
a control means for operating the distance measuring means, the first swing mechanism, and the second swing mechanism; and
a coordinate transformation means for calculating contour points using coordinate transformation based on distances measured by the distance measuring means, and angle information of the first swing mechanism and the second swing mechanism.

6. The device for measuring an edge profile of a semiconductor wafer as claimed in claim 5, further comprising an image analysis means for calculating dimensions of the edge region of the semiconductor wafer by image analysis of the contour profile represented by acquired points-related data.

7. The device for measuring an edge profile of a semiconductor wafer as claimed in claim 5, wherein the guide supports the semiconductor wafer so as to be rotatable in a circumferential direction.

8. The device for measuring an edge profile of a semiconductor wafer as claimed in claim 6, wherein the guide supports the semiconductor wafer so as to be rotatable in a circumferential direction.

* * * * *